United States Patent
Jain et al.

(10) Patent No.: US 10,878,434 B2
(45) Date of Patent: Dec. 29, 2020

(54) SPECIALIZED COMPUTER MODULES FOR ENHANCING USER INTERFACES WITH ITEM SEASONALITY INDICATORS

(71) Applicant: eBay Inc., San Jose, CA (US)

(72) Inventors: Neeraj Jain, San Jose, CA (US); Laura Bermudez, San Jose, CA (US)

(73) Assignee: eBay Inc., San Jose, CA (US)

( * ) Notice: Subject to any disclaimer, the term of this patent is extended or adjusted under 35 U.S.C. 154(b) by 264 days.

(21) Appl. No.: 15/679,703

(22) Filed: Aug. 17, 2017

(65) Prior Publication Data

US 2019/0057405 A1     Feb. 21, 2019

(51) Int. Cl.
| | | |
|---|---|---|
| *G06Q 30/02* | (2012.01) | |
| *G06F 16/957* | (2019.01) | |
| *G06N 20/00* | (2019.01) | |
| *G06F 16/9535* | (2019.01) | |
| *G06Q 30/06* | (2012.01) | |

(52) U.S. Cl.
CPC ....... *G06Q 30/0202* (2013.01); *G06F 16/957* (2019.01); *G06F 16/9535* (2019.01); *G06N 20/00* (2019.01); *G06Q 30/0631* (2013.01)

(58) Field of Classification Search
CPC ... G06Q 30/0202; G06F 16/957; G06N 20/00
USPC .......................................... 705/7.31; 706/61
See application file for complete search history.

(56) References Cited

U.S. PATENT DOCUMENTS

| | | |
|---|---|---|
| 7,792,858 B2 | 9/2010 | Tang et al. |
| 8,386,406 B2 | 2/2013 | Bolivar et al. |
| 9,081,857 B1 * | 7/2015 | Huet ................... G06F 16/951 |
| 9,183,259 B1 | 11/2015 | Marra et al. |
| 2004/0098296 A1 * | 5/2004 | Bamberg ............ G06Q 10/087 705/7.31 |

(Continued)

FOREIGN PATENT DOCUMENTS

| | | | |
|---|---|---|---|
| JP | 2011128737 A | * | 6/2011 |
| WO | 2019/036271 A1 | | 2/2019 |

OTHER PUBLICATIONS

Kim Salazar, 2015, Indicators, Validations, and Notifications: Pick the Correct Communication Option (Year: 2015).*

(Continued)

*Primary Examiner* — Tarek Elchanti
(74) *Attorney, Agent, or Firm* — Schwegman Lundberg & Woessner, P.A.

(57) ABSTRACT

A method of enhancing a user interface of a network-based publication system based on seasonality scores associated with items featured in listings posted on the network-based publication system is disclosed. Seasonality data is generated for each of the items. The generating of the seasonality data includes identifying a season corresponding to transaction data pertaining to each of the items and storing the seasonality data in conjunction with the transaction data in a database. The season pertains to a selected user action that is to result in a presentation of a user interface on a device of the user. Seasonality scores are calculated and associated with the items featured in a subset of the listings that are candidates for inclusion in the presentation of the user interface. Relevancy scores are adjusted for each of the candidates and are incorporated into a presentation of the listings in the user interface.

20 Claims, 9 Drawing Sheets

(56) References Cited

U.S. PATENT DOCUMENTS

| | | | | |
|---|---|---|---|---|
| 2007/0094066 A1* | 4/2007 | Kumar | ............... | G06Q 10/06 |
| | | | | 706/61 |
| 2010/0138273 A1* | 6/2010 | Bateni | ............... | G06Q 30/02 |
| | | | | 705/7.31 |
| 2014/0156620 A1 | 6/2014 | Gardner | | |

OTHER PUBLICATIONS

"International Application Serial No. PCT US2018 045947, International Search Report dated Oct. 9, 2018", 4 pgs.
"International Application Serial No. PCT US2018 045947, Written Opinion dated Oct. 9, 2018", 8 pgs.
International Preliminary Report on Patentability received for PCT Patent Application No. PCT/US2018/045947, mailed on Feb. 27, 2020, 10 pages.

\* cited by examiner

| Column¤ | | | | |
|---|---|---|---|---|
| Name¤ | AttrValue¤ | Month¤ | Transactions¤ | Ratio¤ |
| Material¤ | Wool-Blend¤ | Jun¤ | 116842¤ | 0.22¤ |
| Material¤ | Wool-Blend¤ | May¤ | 128351¤ | 0.25¤ |
| Material¤ | Wool-Blend¤ | Jul¤ | 130391¤ | 0.25¤ |
| Material¤ | Wool-Blend¤ | Apr¤ | 145093¤ | 0.28¤ |
| Material¤ | Wool-Blend¤ | Aug¤ | 196963¤ | 0.38¤ |
| Material¤ | Wool-Blend¤ | Mar¤ | 220149¤ | 0.42¤ |
| Material¤ | Wool-Blend¤ | Feb¤ | 271743¤ | 0.52¤ |
| Material¤ | Wool-Blend¤ | Sep¤ | 303417¤ | 0.58¤ |
| Material¤ | Wool-Blend¤ | Jan¤ | 356110¤ | 0.68¤ |
| Material¤ | Wool-Blend¤ | Dec¤ | 419987¤ | 0.81¤ |
| Material¤ | Wool-Blend¤ | Oct¤ | 426808¤ | 0.82¤ |
| Material¤ | Wool-Blend¤ | Nov¤ | 516415¤ | 0.99¤ |

*FIG. 7*

SPECIALIZED COMPUTER MODULES FOR ENHANCING USER INTERFACES WITH ITEM SEASONALITY INDICATORS

TECHNICAL FIELD

The present application relates generally to the technical field of specialized computer processes for enhancing user interfaces, and, in one specific example, to enhancing a presentation of listings of items on a network-based publication system based on seasonality indicators pertaining to the items.

BACKGROUND

A network-based publication system, such as eBay, Amazon.com, or Craigslist, may feature listings of items (e.g., goods or services). The listings may be posted by a member of the network-based publication system (e.g., a seller) and surfaced via one or more user interfaces to other members or users of the network-based publication system (e.g., potential buyers). Revenues received by an operator of the network-based publication system may depend, at least partly, on a number of transactions completed between members of the network-based publication system over a time period. Thus, enhancements to the user interfaces of the network-based publication system that encourage members to complete more transactions may be valuable to the operator.

BRIEF DESCRIPTION OF THE DRAWINGS

Some embodiments are illustrated by way of example and not limitation in the figures of the accompanying drawings.

FIG. 7 is a graphical representation of seasonality (or "sell") scores calculated for a set of completed transactions of items having a value of "Wool Blend" for a "Material" aspect.

DETAILED DESCRIPTION

Figure 1:
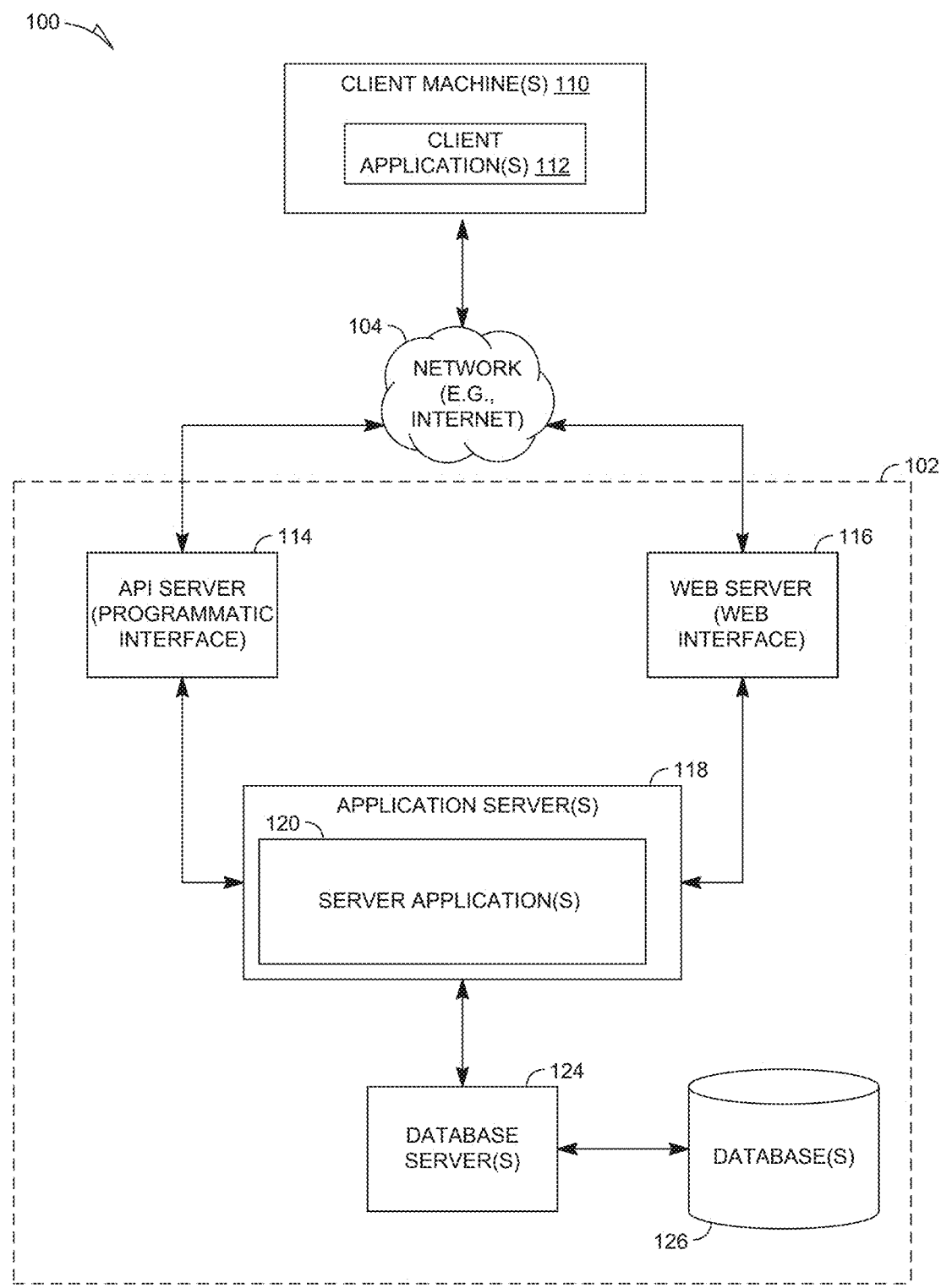
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

In example embodiments, one or more specialized computer modules are incorporated into a network-based publication system to configure one or more processors of the network-based publication system to generate item seasonality scores and indicators for items (and for values of aspects of items) listed on the network-based publication system.

In example embodiments, the item seasonality scores are used to adjust rankings of items or filter items presented to the members of the network-based publication system in one or more user interfaces, including, for example, a search user interface and a browsing user interface.

In example embodiments, the item seasonality indicators are incorporated into the listings of the items as one or more visual elements representing the seasonality score associated with a value of an aspect (or attribute) of an item or associated with the item itself.

In example embodiments, the values of the aspects of the items may specify details about an item featured in a listing, including any value for any aspect specified by a seller of the item when posting the listing of the item on the network-based publication system. For example, aspects may include the brand, size, color, style, condition, or material of the listed item. Aspects may also include images, titles, keywords, or descriptions associated with the listed item.

Seasonality can be thought of in many different ways, but may generally represent a periodic fluctuation of measured user behavior that is of interest to an operator of the network-based publication system. Such user behavior may include completed transactions, viewings of listings, bidding on items, watching of items, or other user behavior (e.g., over a specific time period). For example, completed transactions of sales pertaining to items or aspects of items may be compared with respect to seasons comprising each of the twelve months of the year, time periods corresponding to the traditional four seasons of a year (e.g., winter, spring, summer, or fall), periods of time having certain weather conditions (e.g., temperature ranges, precipitation, humidity, and so on), periods of time associated with holidays or other special occasions, traditional retail events (e.g., back-to-school events), and so on.

Based on the fluctuation of user behavior over a determined or selected "season," a seasonality score may be generated for each item or value of an aspect of an item for any point in the season. A higher seasonality score may indicate that the item is in season at a particular point during a time period, whereas a lower seasonality score may indicate that the item is out of season at that particular point. As an example, the seasonality score for a value of an aspect may have a range (e.g., from 0 to 10 or 0 to 100). A Halloween costume may have its highest seasonality score (e.g., 100) during the Halloween season (e.g., Halloween day itself or a predetermined number of days or weeks before and/or after the Halloween holiday) and its lowest score (e.g., 0) at a different time of the year. In example embodiments, the seasonality score for an item may be an independent score based on analysis of the performance of the item itself with respect to the user behavior of interest, based on an aggregation of seasonality scores corresponding to each of the values of the aspects of the item with respect to the user behavior of interest, or based on both, as described in more detail below.

In example embodiments, the seasonality score for an item may be used to adjust a relevancy score for the item, causing listings for the item to appear more prominently in one or more user interfaces presented to the user, such as a user interface for browsing items listed on the network-based publication system or a user interface for displaying search results for the user. Thus, for example, if a user is browsing listings posted on the network-based publication system during Christmas, items having a higher seasonality score for Christmas may have their relevancy scores boosted and thus be ranked higher in browsing results that are displayed to the user.

In example embodiments, a search user interface may be enhanced such that search results displayed to the user incorporate seasonality scores relevant to a search being performed by the user. For example, it may be determined, based on keywords entered by the user, that the user is searching for an item that the user intends to purchase for use at a particular time and location. This particular time or location can be compared with one or more defined seasons associated with the location. Then listings pertaining to items may have their relevancy scores adjusted based on a correspondence between the item and the one or more of the defined seasons. Thus, for example, a user may enter the search terms "tent for camping in Tahoe." It may be determined (e.g., implicitly, based on user behavior) that the user intends to purchase the tent immediately. Assuming the current date and time corresponds to the winter months in Tahoe, tents having higher seasonality scores for a "winter" season may be boosted in the search result rankings that are ultimately presented to the user.

As another example, a user may enter the search terms "wedding dress for winter." It may be determined (e.g., implicitly, based on user behavior) that the user will be getting married in Seattle. Additionally, it may be determined (e.g., based on the keyword "winter") that the user will be getting married during one of the traditional winter months in Seattle (e.g., December, January, or February). Additionally, it may be determined that the average temperatures in Seattle during the winter months range from 37 to 55 degrees Fahrenheit during the winter months. Based on these determinations, listings for wedding dresses having a higher seasonality score for this temperature range may be boosted for presentation with more visual prominence in search results that are ultimately displayed to the user in response to the user's search query.

A method of enhancing a user interface of a network-based publication system based on seasonality scores associated with items featured in listings posted on the network-based publication system is disclosed. Seasonality data is generated for each of the items. The generating of the seasonality data includes identifying a first season. The first season corresponds to transaction data pertaining to each of the items. The seasonality data is stored in conjunction with the transaction data in a database. A second season is identified. The second season pertains to a user action that is to result in a presentation of a user interface on a device of the user. The user action includes a searching action or a browsing action. Seasonality scores are calculated for items featured in a subset of the listings. The subset of the listings includes candidates for inclusion in the presentation of the user interface. The seasonality scores are calculated based on the identified second season and the generated seasonality data. Relevancy scores are adjusted for each of the candidates based on the seasonality scores. The adjusted relevancy scores are incorporated into the presentation of the user interface. The incorporating of the adjusted relevancy scores boosts a visual prominence of a subset of the candidates within the user interface based on the seasonality scores. In example embodiments, the seasonality data that is generated for each of the items is based on an aggregation of seasonality data that is generated for one or more aspects of each of the items.

In example embodiments, one or more applications executing on one or more client devices may communicate with one or more applications executing on a network-based publication system (e.g., via one or more seasonality score interfaces) to obtain seasonality data pertaining to items or aspects of items. For example, client applications may query the publication system for items or aspects of items having a predetermined number of highest seasonality scores for a particular season or for a number of items or aspects of items having seasonality scores greater than a threshold seasonality score. As another example, client applications may query the publication system for seasonality scores generated for particular items or aspects of items for one or more seasons. Upon receiving the requested data, the client applications may perform any number of tasks, such as generating user interfaces to visually represent the seasonality score data, filter presentations of items based on the seasonality scores, and so on.

This method and various operations disclosed herein may be implemented as a computer system having one or more modules (e.g., hardware modules or software modules) that are specially designed and incorporated into the computer system to perform this method or one or more of the operations described herein. This method and various operations disclosed herein may be embodied as instructions stored on a machine-readable medium that, when executed by a machine, cause the machine to perform the method or one or more of the various operations.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stares, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
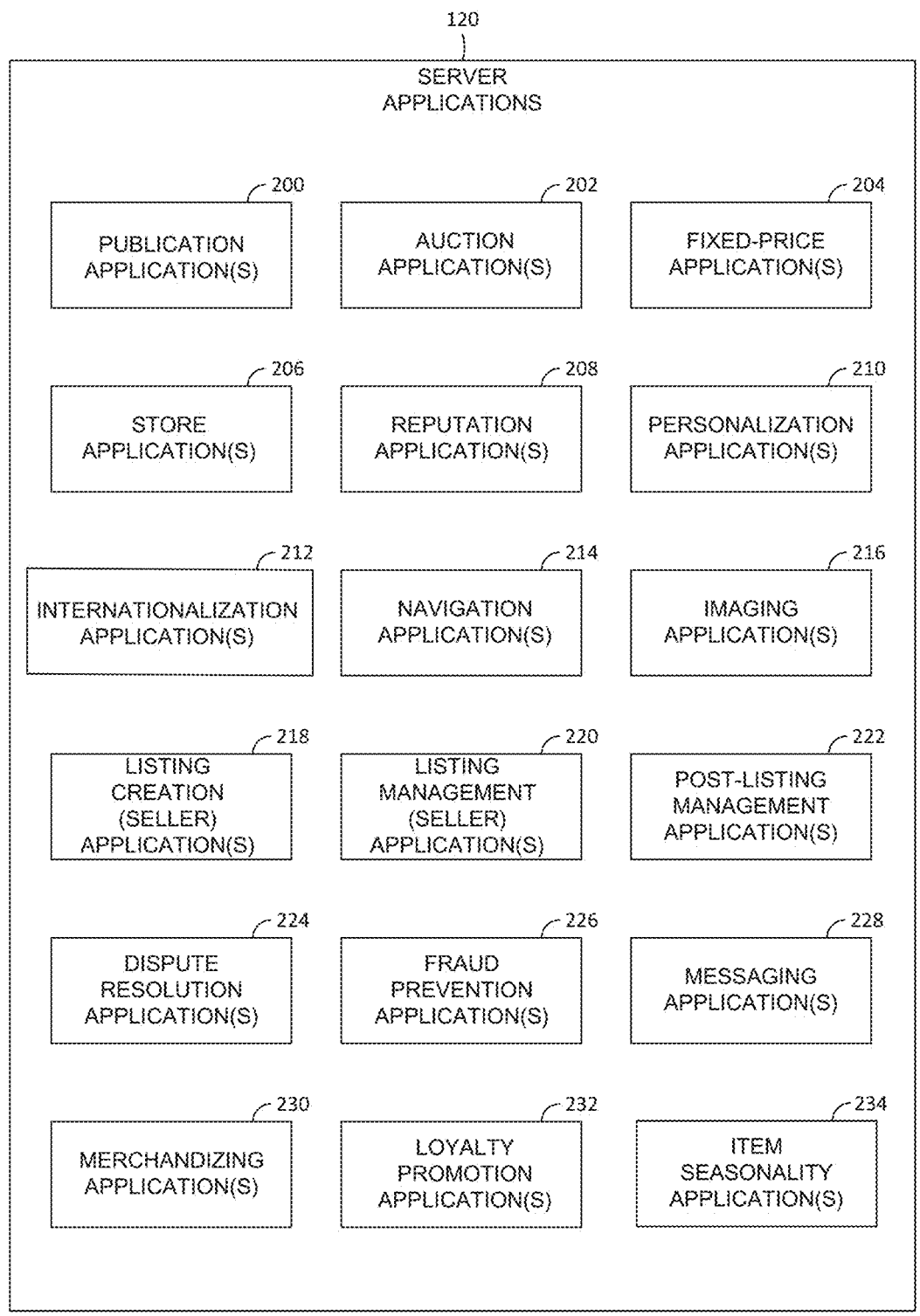
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Item seasonality application(s) 234 may include one or more applications for calculating seasonality scores for items or values of aspects of items, determining an intention of a user with respect to a potential purchase of an item, adjusting a relevancy score for listings that are to be presented to the user based on the calculated seasonality scores and the intention of the user, and enhancing user interfaces for presenting the listings to the user in response to user actions, as explained in more detail below.

Figure 3:
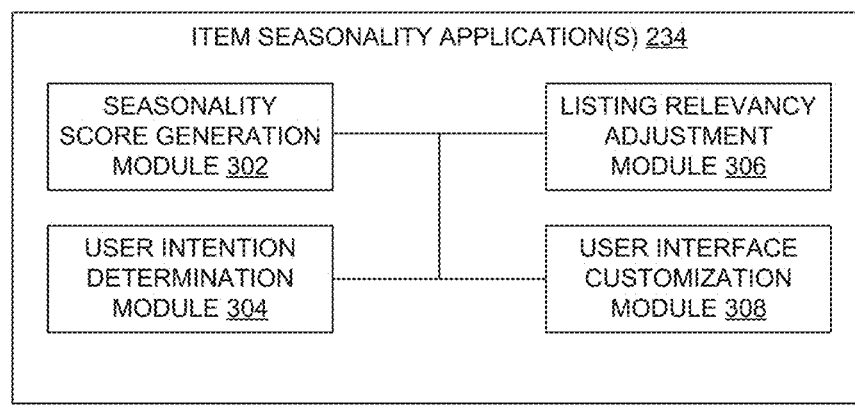
FIG. 3 is a block diagram illustrating example modules of the item seasonality application(s) 234.

FIG. 3 is a block diagram illustrating example modules of the item seasonality application(s) 234. A seasonality score generation module 302 may be configured to generate seasonality scores for items featured in listings posted on the network-based publication system, as explained in more detail below. A user intention determination module 304 may be configured to determine an intention of the user with respect to potential purchasing of items featured in the listings (e.g., based on implicitly-gathered data or explicitly-gathered data pertaining to the user's intention), as explained in more detail below. A listing relevancy adjustment module 306 may be configured to adjust relevancy scores for listings that are to be presented to the user in a user interface in response to the determined intention of the user, the adjusting based on the generated seasonality scores, as explained in more detail below. A user interface customization module 308 may be configured to enhance one or more user interfaces of the network-based publication system to incorporate the seasonality scores, including boosting visual prominence of results based on the seasonality scores or surfacing seasonality data via visual representations of the seasonality data, as described in more detail below.

Figure 4:
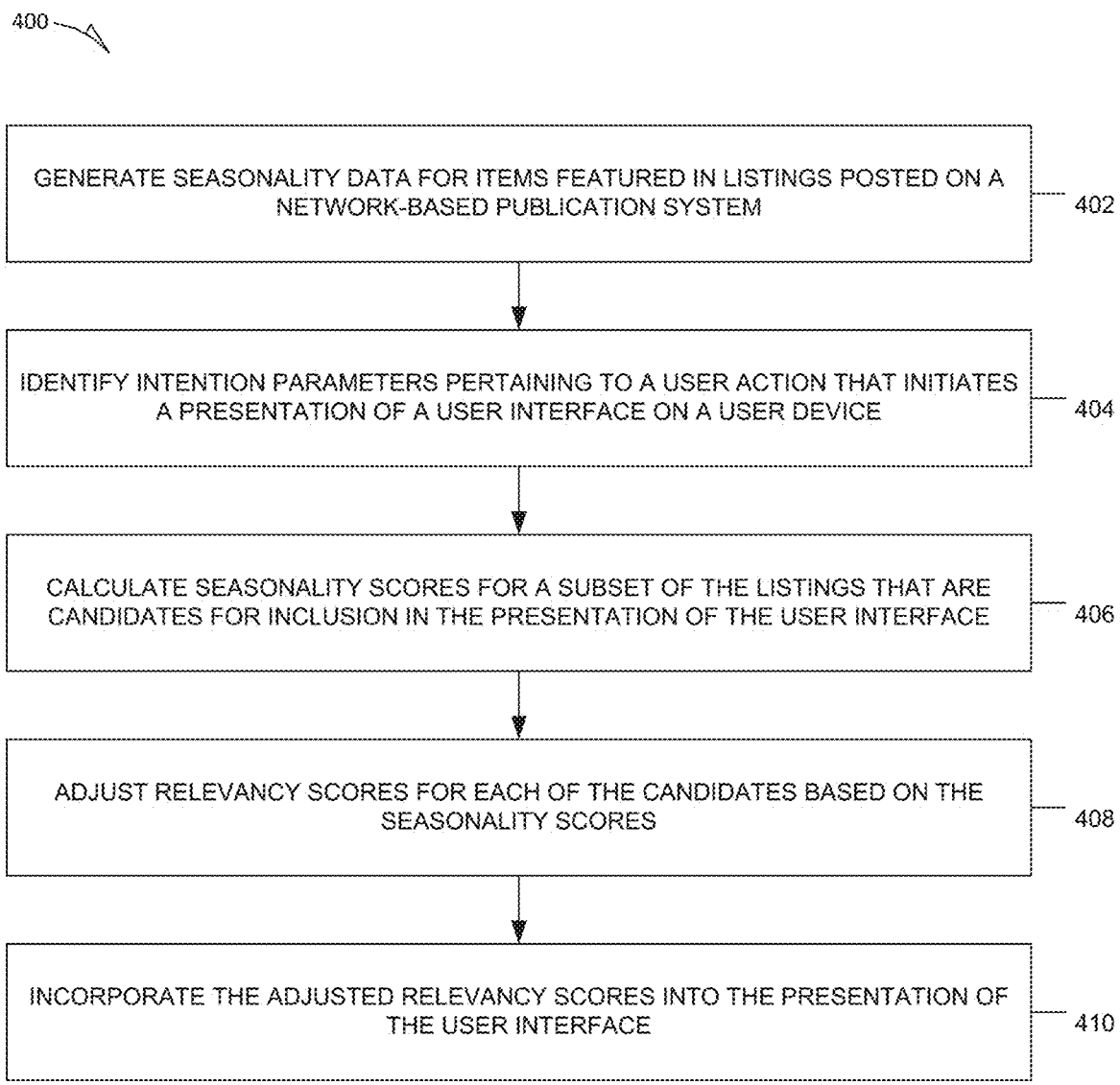
FIG. 4 is a flowchart illustrating example operations of a method of enhancing one or more user interfaces of a network-based publication system based on seasonality scores corresponding to items featured in listings posted on the network-based publication system.

FIG. 4 is a flowchart illustrating example operations of a method 400 of enhancing one or more user interfaces of a network-based publication system based on seasonality scores corresponding to items featured in listings posted on the network-based publication system. In various embodiments, the operations may be performed by one or more modules of the item seasonality application(s) 234.

At operation 402, seasonality data is generated for items featured in listings posted on a network-based publication system. In various embodiments, this seasonality data includes a score indicating how "in-season" an item is at one or more recurring time periods, such as during each month of a year, each of the traditional four seasons of a year, during periods of the year having a predetermined or selected temperature range, and so on. Seasons may correspond to meteorological seasons, astronomical seasons, solar seasons corresponding to the location, official dates (e.g., as specified by a government) corresponding to the location, traditional calendar dates corresponding to the location, or non-calendar-based dates, such ecological seasons, including the modern mid-latitude ecological season (e.g., prevernal, vernal, estival, serotinal, autumnal, hibernal), tropical ecological season, or an indigenous ecological season. As explained above, seasons may also correspond to recurring holidays, special occasions, retail events, and so on. In example embodiments, the score is also tied to a geographical location. Thus, for example, seasons may be defined as corresponding to different times of the year for locations in the northern hemisphere in comparison to locations in the southern hemisphere.

In example embodiments, every item that has been listed on the network-based publication system within a time frame (e.g., five years) is assessed against one or more selected seasons with respect to a measure of performance (e.g., as selected by an operator or administrator of the network-based publication system). Examples of measures of performance may include an amount of revenue received from the users as a result of their actions (e.g., transaction fees collected or advertising revenues generated), an amount of user activity generated with respect to the network-based publication system (e.g., viewing pages, sharing content items, or "liking" content items, placing bids on an item, completed transactions to purchase items, watching listings of items (e.g., subscribing to be notified of bids, changes, or other information pertaining to a listing of the item), viewing listings of the item (e.g., accessing a content page providing information on the item), a number of opportunities to present advertisements, and so on.

In various embodiments, each of the actions that a user may perform with respect to the item may be assigned a significance rating. For example, based on a placing of a bid or a purchasing of an item resulting in transaction fees being collected (e.g., from the seller, buyer, or both), the action of placing a bid or purchasing the item may be assigned a significance rating that reflects the amount of the transaction fees collected. Similarly, if the viewing of a listing of an item by the users results in an amount of advertising revenue being collected, the action of the viewing of the listing of the item may be assigned a significance rating that reflects the amount of advertising revenue. In various embodiments, the significance ratings may then be used to weight the item seasonality score for each item.

In example embodiments, aspect seasonality scores may be separately determined for each of the values of the aspects of the previously-listed items. Examples of aspects of items may include price, material (e.g., cashmere or knitted cotton blend), size (e.g., S, M, L, XL), image (e.g., a reference to an image file, such as a .jpg or .bmp file), gender (e.g., male or female), size type (e.g., slim, regular, or plus size), age group (e.g., youth or adult), brand (e.g., a name brand or unbranded), style (e.g., collared), and so on. In example embodiments, the aspects and values may be specified by sellers of the items in free form when they are posting the listing for the items. In example embodiments, one or more aspects may be preselected for providing by the sellers and one or more values for the aspects may be provided as candidate values (e.g., based on free-form values previously entered by other users for similar items), thus ensuring that sellers provide more normalized aspects and values for comparison.

In example embodiments, each of the aspect seasonality scores may be assigned a significance weighting, just as with the item seasonality scores, as described above.

In example embodiments, the item seasonality scores may be calculated or adjusted based on an aggregation of the weighted aspect seasonality scores corresponding to the items.

At operation 404, a user action that initiates a presentation of a user interface is detected, such as a user action related to browsing listings posted on the network-based publication system or searching listings postings on the network-based publication system. Parameters pertaining to the user action that relate to an intention of the user are analyzed. Such parameters may include implicitly- or explicitly-determined information regarding the intention of the user, including, for example, a specific item or type of item that the user has expressed an interest in purchasing (e.g., a "tent"), a time period in which the user intends to complete a purchase or have the item delivered to a location (e.g., "winter"), the location where the user intends to receive or use the item (e.g., "Tahoe"), an intended use of the item (e.g., "camping"), and so on. In example embodiments, explicitly-determined information may be derived from keywords specified by the user in a search query, such as a name of the item, a location, or a season identifier. A season identifier may be one or more keywords that identify a time period related to the search, such as one or more traditional seasons (e.g., "winter," "spring," "summer," or "fall"), a specific month of the year, or any other keyword that can be correlated to one of more seasons. In example embodiments, a user interface option may be presented to the user in which the user can explicitly specify or select the season that the user intends to associate a purchase of the item.

In example embodiments, implicitly-determined information may include information derived from an analysis of behavior of the user with respect to the network-based publication system, including items liked, watched, viewed, bid upon, purchased, and so on.

At operation 406, a subset of the listings that are candidates for inclusion in the presentation of the user interface are identified. For example, a subset of the listings posted on the network-based publication system that are deemed most relevant to the keywords entered by the user in a search box (e.g., those having the highest relevancy scores) may be identified. Or the most relevant items in a browsing category or link selected by the user may be identified (e.g., based on relevancy scores to the selected category).

At operation 408, the relevancy scores for each of the candidate items are adjusted based on their seasonality scores. For example, if the parameters of the user action suggest that the intention of the user is to purchase an item during the winter season in the Northern hemisphere, the relevancy scores for the candidate items that have the highest seasonality scores for the winter season will receive a boost. In example embodiments, the amount of the boost may be proportional to the seasonality score. For example, items that have a 100 seasonality score (on a scale of 0-100) in relation to the parameters of the user action may have their relevancy scores boosted twice as much as items that have a 50 seasonality score. In example embodiments, the amount of the boost will be based on feedback loop integration, as described in more detail below.

Figure 6A:
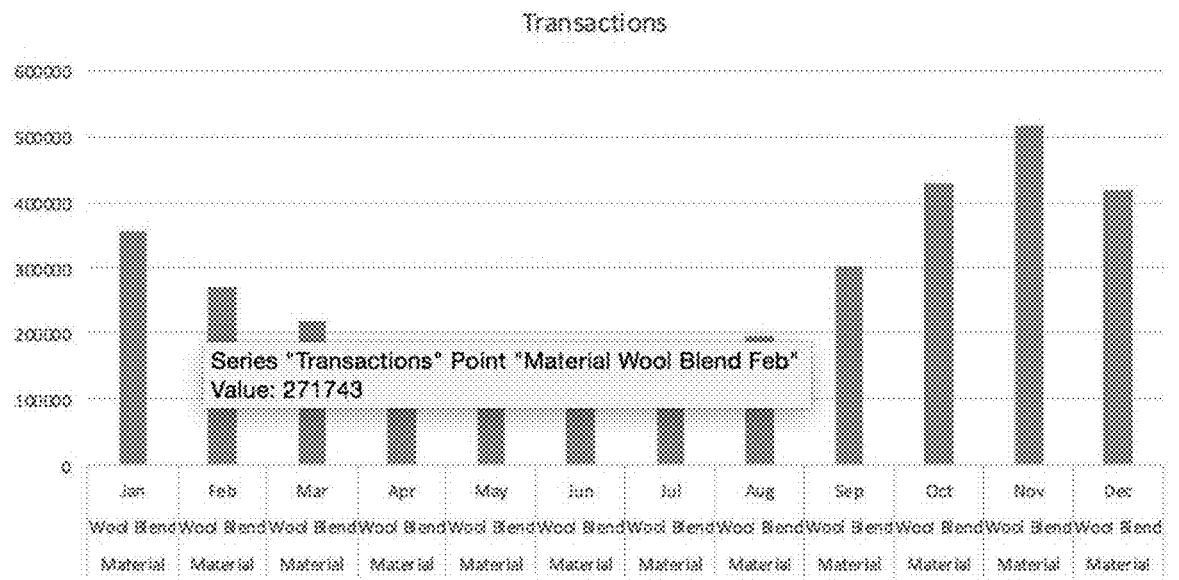
FIG. 6A is a graphical representation of transaction data pertaining to values of an aspect of an item during seasons comprising each of the months of the year.
Figure 6B:
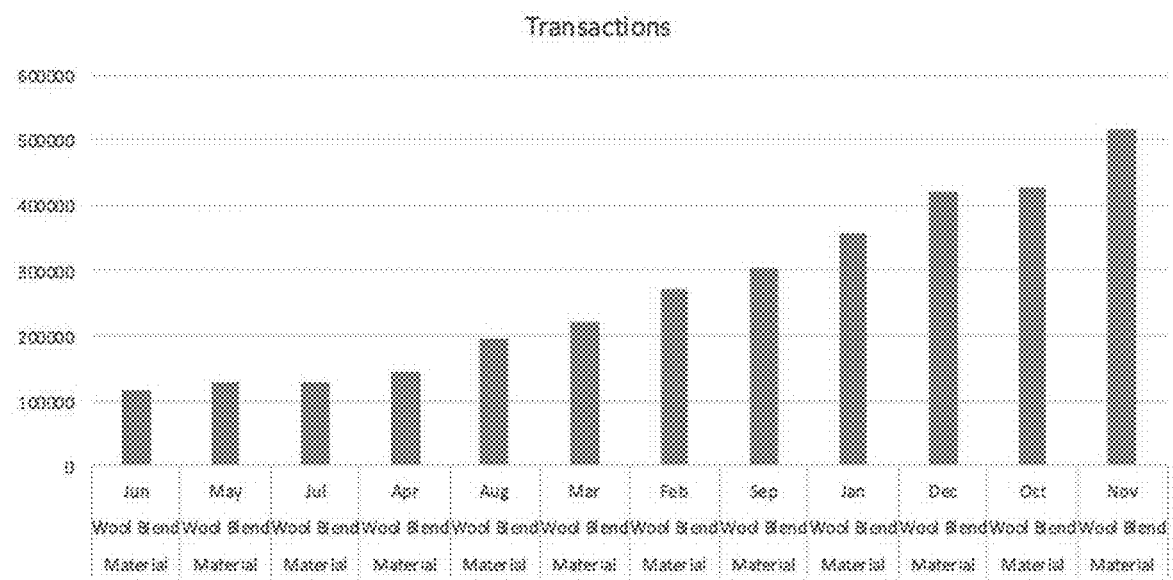
FIG. 6B is a graphical representation of transaction data pertaining to values of an aspect of an item during seasons comprising each of the months of the year.

At operation 410, the adjusted relevancy scores are incorporated into the presentation of the user interface to the user. Thus, for example, items having higher seasonality scores will receive more visual prominence in a display of the listings of the items than they would've had without the boost. In example embodiments, increasing the visual prominence of a listing may include changing the order of browsing results or search results to reflect the higher seasonality scores, highlighting the boosted results (e.g., through changes in font size or font style, through visual indicators, such as ranges of colors that are selected to represent various ranges of seasonality scores, or through outlining or other visual cues). In example embodiments, a visual representation of the seasonality scores identified for each item may be presented in the user interface. The visual representation may be indicative of how "in-season" the item is with respect to the identified intended season for which the user intends to purchase the item. In example embodiments, visual representations may be presented to surface seasonality data, including a graph of the seasonality data for the item over a time period. Thus, for example, a visual representation may show a fluctuation of seasonality data (e.g., from high to low) of the item or aspects of the item over the time period. FIGS. 6A and 6B are illustrative of a graph of seasonality data that may be incorporated into the user interface with respect to the "Material" aspect of a clothing item.

Figure 5:
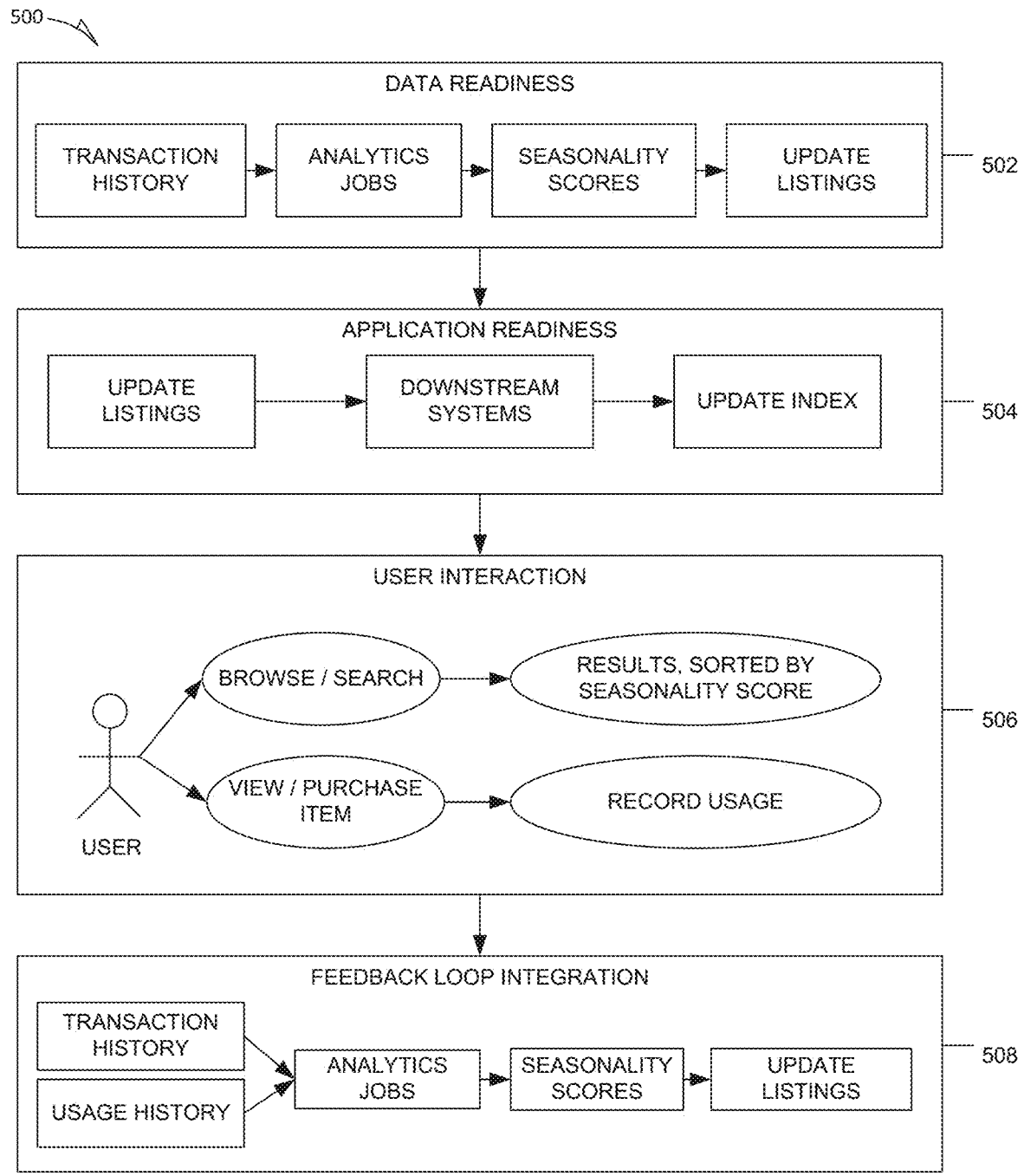
FIG. 5 is a flowchart illustrating example operations of a method of implementing a feedback loop for modifying seasonality scores to improve a network-based publication system with respect to a performance metric of importance to an operator of the network-based publication system.

FIG. 5 is a flowchart illustrating example operations of a method 500 of implementing a feedback loop for modifying seasonality scores to improve a network-based publication system with respect to a performance metric of importance to an operator of the network-based publication system. In various embodiments, the method 500 may be performed by various modules of the item seasonality application(s) 234.

At operation 502, data readiness is ensured. In example embodiments, ensuring data readiness includes analyzing a large transaction history (e.g., hundreds of thousands of transactions that were completed by users of the network-based publication system over a predetermined time period, such as five years). For example, fluctuations of numbers of transactions involving the items may be determined over various selected seasons and then a corresponding seasonality score generated for each of the items, types of items, or values of aspects of the items. Database records associated with the items may be updated with information relevant to determination of a seasonality score for the items. As an example, a database record for an item or type of item for which a transaction was completed may be updated with "weather," "occasion," and "temp-range" indicators that were in existence at the time of the completed transaction or determined (e.g., through monitoring of user behavior, as described above) to be parameters that led to the completed transaction. Thus, a database record for a particular completed transaction may look like this after it is associated with seasonality indicators: {"transaction_id": "152222082053", "weather": "winter", "occasion": ["christmas", "new year"] "temp-range": "40-50"}.

Based on the analysis of completed transactions, seasonality scores may be generated for the items themselves, types of items, or values of aspects of the items. Thus, for example, seasonality scores may be generated for a "Material" aspect of items (e.g., in a selected historical set of completed transaction records) having a value of "Wool Blend" based on a number of completed transactions during each month of the year, as depicted in FIGS. 6A and 6B. In example embodiments, the month of November is the most "in season" month for items having a Wool Blend material, and thus the month of November receives the highest seasonality score for this value of this aspect. In contrast, the month of June is the least "in-season" month for items having a Wool Blend material, and thus the month of June receives the lowest seasonality score for this value of this aspect. In example embodiments, the seasonality score for a value of an aspect of an item may be based on relative seasonality scores for other values of the aspect of the item. Thus, if 500,000 transactions of items having Wool Blend material are completed in November out of 700,000 total transactions, the seasonality score for the Wool Blend aspect may be set to 5/7 of a scaled score (e.g., from 0-100).

In example embodiments, listings may be updated with seasonality data (e.g., seasonality data items may be stored in a database and referenced from database records corresponding to items featured in the listings). The seasonality data may be surfaced to potential buyers via one or more user interfaces (e.g., as described above) such that potential buyers may make more informed purchasing decisions (e.g., wait for an out-of-season time to purchase in order to secure a lowing selling price). The seasonality data may be provided to sellers via one or more user interfaces such that the sellers can make more informed decisions when posting listings (e.g., when specifying price or other options, such as a higher price when the item or aspects of the item are in season or a lower price when the item or aspects of the item are out of season).

At operation 504, application readiness is ensured. For example, listing creation application(s) 218, listing management application(s) 220, or post-listing management application(s) 222 may be updated to query the item seasonality application(s) 234 for seasonality data (e.g., via one or more APIs) and incorporate the seasonality data in one or more enhanced user interfaces that are presented to a seller upon creating or managing a listing. Store application(s) 206 and navigation application(s) 214 may be updated to query the item seasonality application(s) 234 for seasonality data, adjust relevancy scores associated with listings that are to be presented to a user via one or more user interfaces, and enhance the one or more user interfaces to incorporate seasonality scores, as described above. In example embodiments, database records storing seasonality data may be generated and indexed for efficient access by specific applications, such as searching or browsing applications.

At operation 506, user interactions are monitored for feedback loop integration. In particular, user behavior is tracked with respect to metrics of importance to an operator of the network-based publication system, such as browsing, searching, viewing, or purchasing or items. The particular activities performed by the user with respect to the one or more user interfaces that are presented to the user are recorded and used in subsequent feedback loop integration.

At operation 508, feedback loop integration is implemented. Transaction histories are analyzed in view of recorded usage histories. For example, analytics jobs are performed to measure the impact of the incorporation of feedback scores into one or more user interfaces with respect to performance metrics of importance to the operator. For example, A/B testing may be performed on user interfaces presented to users with and without adjustments based on seasonality scores. Thus, for example, a rate of conversion (e.g., a number of completed transactions) for an item may be compared between different user interfaces to determine how much of a difference the enhanced user interfaces make with respect to the rate of conversion. Based on the significance of the difference, seasonality scores for particular items or aspects of items may be adjusted or weighted such that the rate of conversion or other user behavior is further incentivized over time. Thus, the seasonality data may become more refined with respect to particular performance metrics or adapt to changing market conditions.

FIG. 6A is a graphical representation of transaction data pertaining to values of an aspect of an item during seasons comprising each of the months of the year. In this particular example, completed transactions for items having a "Material" aspect with a value of "Wool Blend" are graphed with respect to each month. In example embodiments, this seasonality data may be presented in one or more user interfaces to users of the network-based publication system, as described above, to help potential buyers and sellers of items make more informed decisions.

FIG. 6B is a graphical representation of transaction data pertaining to values of an aspect of an item during seasons comprising each of the months of the year. In this particular example, the data of FIG. 6A is sorted based on seasonality. Thus, for example, it may be determined that items having a "Material" aspect with a value of "Wool Blend" are most in-season during the month of November and most out-of-season during the month of June. Additionally, the relative seasonality between months may be compared and used to determine the seasonality score to associated with this particular material (e.g., on a scale of 0-100), as described in more detail above.

FIG. 7 is a graphical representation of seasonality (or "sell") scores calculated for a set of completed transactions of items having a value of "Wool Blend" for a "Material" aspect. Here, the range of possible scores is from 0.0 to 0.99. The transaction in November is assigned the highest seasonality score (0.99), whereas the transaction in June is assigned the lowest seasonality score (0.22).

Figure 8:
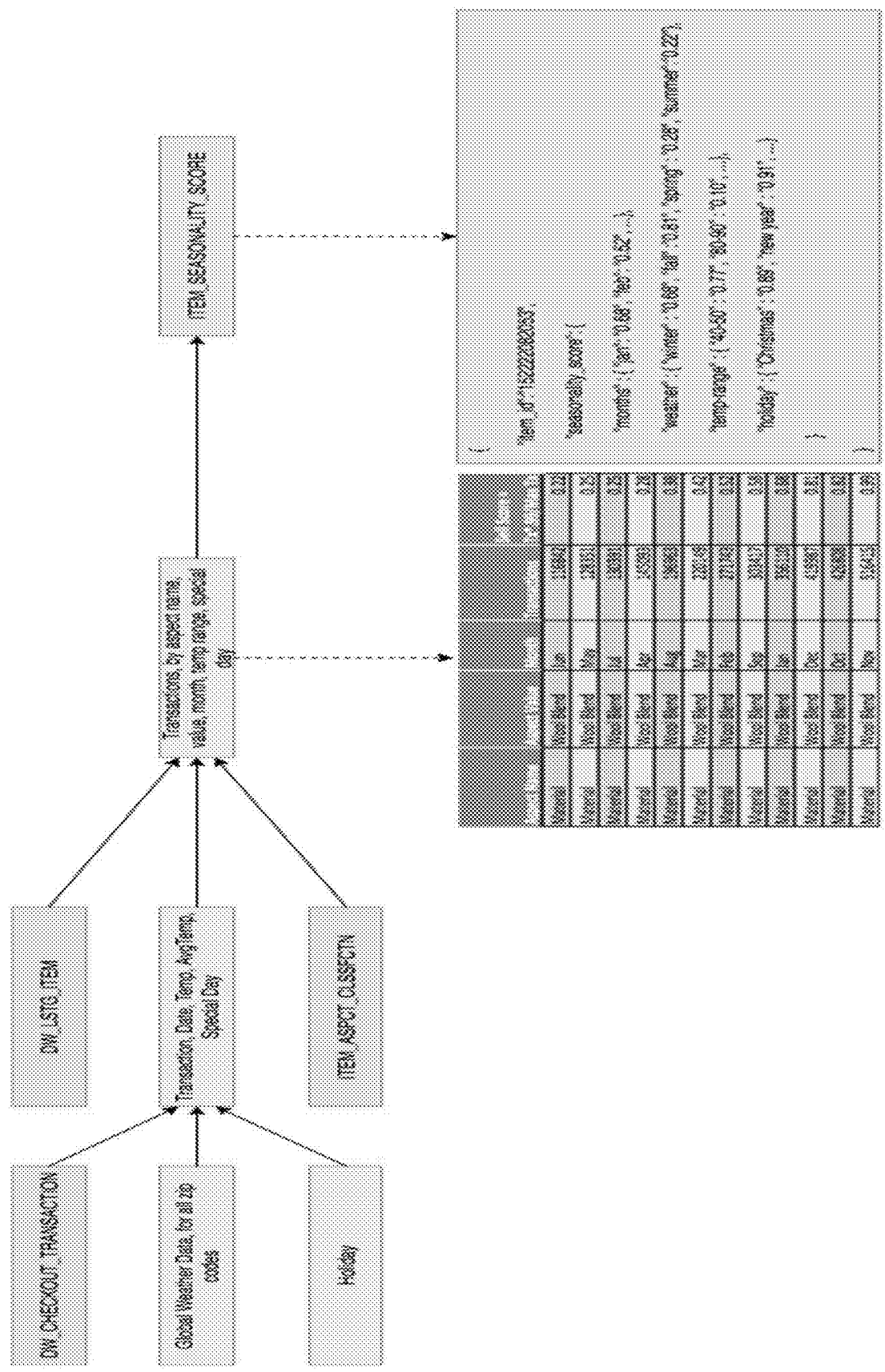
FIG. 8 is a flow chart of associating seasonality scores with aspects of items having particular values.

FIG. 8 is a flow chart of associating seasonality scores with aspects of items having particular values. Transaction data (e.g., from a database table entitled "DW_CHECK-OUT_TRANSACTION") is aggregated with global weather data (e.g., for all zip codes), specified holidays or other periodic time periods corresponding to a "season" that an operator of the network-based publication system wishes to analyze, database records corresponding to listings of items posted on the network-based publication system (e.g., stored in a database table entitled "DW_LISTG_ITEM"), and database records including item aspect classifications. Transactions are analyzed by aspect name, aspect value, month, temperature range, holidays, or other selected season to generate seasonality scores for each transaction, as described in more detail above.

In example embodiments, seasonality scores are stored in a database table (e.g., entitled "ITEM_SEASON-ALITY_SCORE"). Thus, a particular item may have seasonality scores corresponding to months, weather, temperate ranges, or holidays, as shown. An example representation of a database record including seasonality data for an item may be represented as {"item-id": "152222082053", "seasonality_score": {"months": {"jan": "0.68", "feb": 0.52", . . . }, "weather": {"winter": "0.68", "fall": "0.81", "spring": "0.28", "summer": "0.22"}, "temp-range": {"40-50": "0.77", "80-90": "0.10", . . . }, "holiday": {"Christmas": "0.89", "new year": "0.91", . . . }}}.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
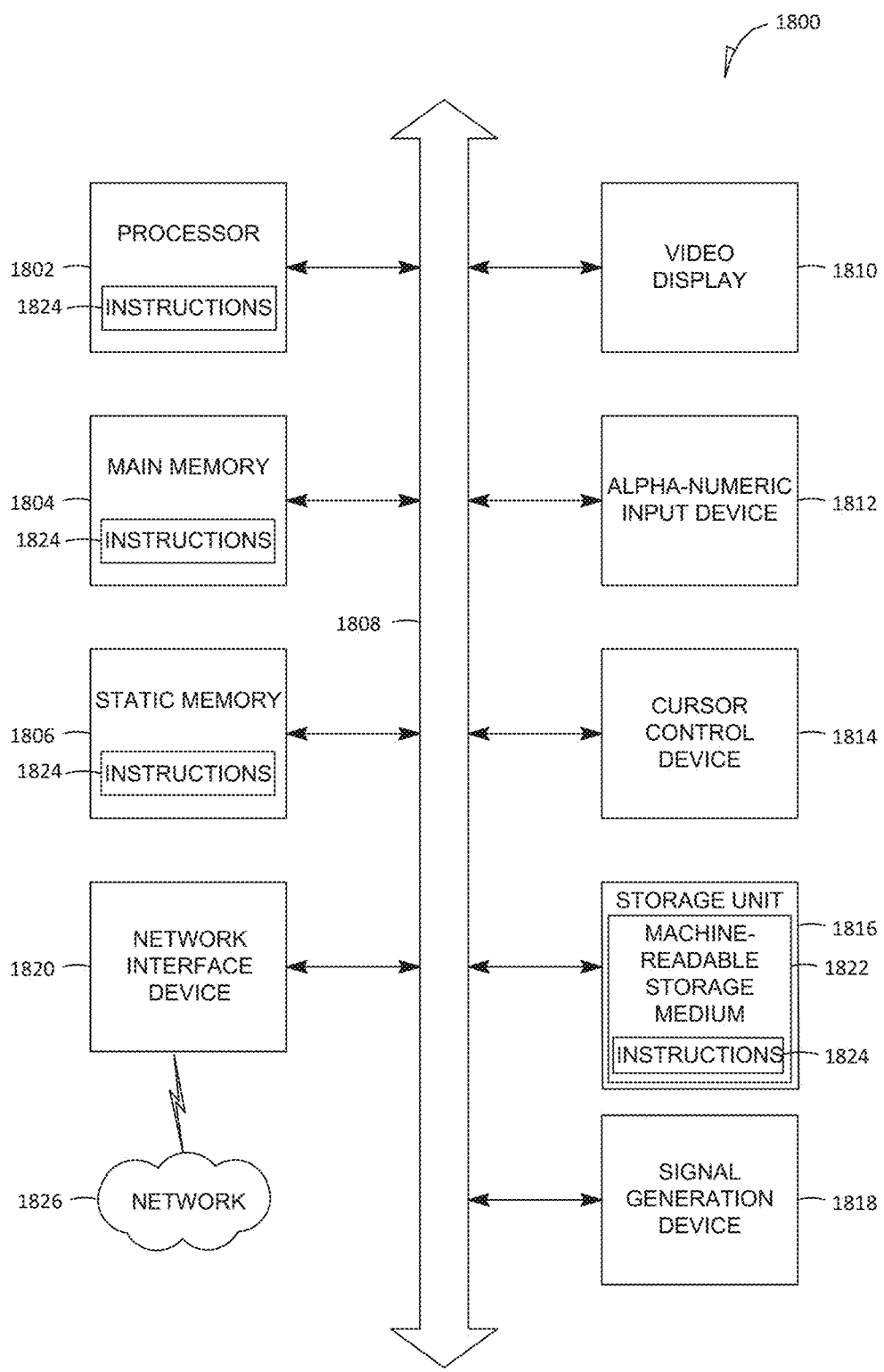
FIG. 9 is a block diagram of machine in the example form of a computer system within which instructions for causing the machine to perform any one or more of the methodologies discussed herein may be executed.

FIG. 9 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly. execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors;
one or more memories storing instructions that, when executed by the one or more processors, cause the one or more processors to perform operations for enhancing a user interface of a network-based publication system, the operations comprising:
updating a navigation application of the network-based publication system, the updating causing the navigation application to query, via one or more APIs, an item seasonality application for seasonality data and adjusted relevancy scores;
receiving, by the updated navigation application, a user input that triggers display of listings in the user interface;
identifying, by the item seasonality application, a season for each of the listings, the season pertaining to a user action including a searching action or a browsing action;
calculating, by the item seasonality application, seasonality scores for items featured in the listings that are candidates for inclusion in a presentation of the user interface, the calculating of the seasonality scores being based on the identified season and corresponding to values associated with physical attributes of the items;
adjusting, by the item seasonality application, relevancy scores for a subset of the candidates based on the seasonality scores;
incorporating the adjusted relevancy scores into the presentation of the user interface, the incorporating of the adjusted relevancy scores including boosting a visual prominence of the subset of the candidates within the user interface based on the adjusted relevancy scores;
causing presentation of the user interface with the subset of candidates shown with boosted visual prominence based on the adjusted relevancy scores;
performing A/B testing on user interfaces presented to users with and without adjustments based on the seasonality scores, the user interfaces including the user interface with the subset of candidates shown with the boosted visual prominence; and
based on an analysis of results of the A/B testing, adjusting the seasonality scores for the items.

2. The system of claim 1, wherein the season includes at least one of the twelve months of the year, at least one of the traditional four seasons of the year, a time period satisfying a predetermined weather condition, or a time period associated with a holiday.

3. The system of claim 2, wherein the predetermined weather condition includes a temperature range.

4. The system of claim 2, wherein the time period associated with the holiday includes any combination of the actual day of the holiday, a period of time before the holiday, or a period of time after the holiday.

5. The system of claim 1, wherein the identifying of the season includes analyzing a combination of implicitly-gathered data and explicitly-gathered data relating to a purchasing intent of the user.

6. The system of claim 5, wherein the implicitly-gathered data includes user behavior data pertaining to a context of the user action and the explicitly-gathered data includes keywords specified in a search query submitted by the user.

7. The system of claim 1, wherein the calculating of the seasonality scores for the items includes aggregating the seasonality scores corresponding to the values associated with physical attributes of the items.

8. A method comprising:
performing operations for enhancing a user interface of a network-based publication system, the operations comprising:
updating a navigation application of the network-based publication system, the updating causing the navigation application to query, via one or more APIs, an item seasonality application for seasonality data and adjusted relevancy scores;
receiving, by the updated navigation application, a user input that triggers display of listings in the user interface;
identifying, using one or more computer processors, a season for each of the listings, the season pertaining to a user action including a searching action or a browsing action;

calculating, using the one or more computer processors, seasonality scores for items featured in listings that are candidates for inclusion in a presentation of the user interface, the calculating of the seasonality scores being based on the identified season and corresponding to values associated with physical attributes of the items;

adjusting, using the one or more computer processors, relevancy scores for a subset of the candidates based on the seasonality scores;

incorporating, using the one or more computer processors, the adjusted relevancy scores into the presentation of the user interface, the incorporating of the adjusted relevancy scores including boosting a visual prominence of the subset of the candidates within the user interface based on the adjusted relevancy scores;

causing presentation of the user interface with the subset of candidates shown with boosted visual prominence based on the adjusted relevancy scores;

performing A/B testing on user interfaces presented to users with and without adjustments based on the seasonality scores, the user interfaces including the user interface with the subset of candidates shown with the boosted visual prominence; and based on an analysis of results of the A/B testing, adjusting the seasonality scores for the items.

9. The method of claim 8, wherein the season includes at least one of the twelve months of the year, at least one of the traditional four seasons of the year, a time period satisfying a predetermined weather condition, or a time period associated with a holiday.

10. The method of claim 9, wherein the predetermined weather condition includes a temperature range.

11. The method of claim 9, wherein the time period associated with the holiday includes any combination of the actual day of the holiday, a period of time before the holiday, or a period of time after the holiday.

12. The method of claim 8, wherein the identifying of the season includes analyzing a combination of implicitly-gathered data and explicitly-gathered data relating to a purchasing intent of the user.

13. The method of claim 12, wherein the implicitly-gathered data includes user behavior data pertaining to a context of the user action and the explicitly-gathered data includes keywords specified in a search query submitted by the user.

14. The method of claim 8, wherein the calculating of the seasonality scores for the items includes aggregating the seasonality scores corresponding to the values associated with physical attributes of the items.

15. A non-transitory machine readable medium comprising a set of instructions that, when executed by a processor, causes the processor to perform operations for enhancing a user interface of a network-based publication system, the operations comprising:

updating a navigation application of the network-based publication system, the updating causing the navigation application to query, via one or more APIs, an item seasonality application for seasonality data and adjusted relevancy scores;

receiving by the updated navigation application, a user input that triggers display of listings in the user interface;

identifying a season for each of the listings, the season pertaining to a user action including a searching action or a browsing action;

calculating seasonality scores for items featured in listings that are candidates for inclusion in a presentation of the user interface, the calculating of the seasonality scores being based on the identified second season and corresponding to values associated with physical attributes of the items;

adjusting relevancy scores for a subset of the candidates based on the seasonality scores;

incorporating the adjusted relevancy scores into the presentation of the user interface, the incorporating of the adjusted relevancy scores including boosting a visual prominence of the subset of the candidates within the user interface based on the adjusted relevancy scores;

causing presentation of the user interface with the subset of candidates shown with boosted visual prominence based on the adjusted relevancy scores;

performing A/B testing on user interfaces presented to users with and without adjustments based on the seasonality scores, the user interfaces including the user interface with the subset of candidates shown with the boosted visual prominence; and based on an analysis of results of the A/B testing, adjusting the seasonality scores for the items.

16. The non-transitory machine readable medium of claim 15, wherein the season includes at least one of the twelve months of the year, at least one of the traditional four seasons of the year, a time period satisfying a predetermined weather condition, or a time period associated with a holiday.

17. The non-transitory machine readable medium of claim 16, wherein the predetermined weather condition includes a temperature range.

18. The non-transitory machine readable medium of claim 16, wherein the time period associated with the holiday includes any combination of the actual day of the holiday, a period of time before the holiday, or a period of time after the holiday.

19. The non-transitory machine readable medium of claim 15, wherein the identifying of the season includes analyzing a combination of implicitly-gathered data and explicitly-gathered data relating to a purchasing intent of the user.

20. The non-transitory machine readable medium of claim 19, wherein the implicitly-gathered data includes user behavior data pertaining to a context of the user action and the explicitly-gathered data includes keywords specified in a search query submitted by the user.

* * * * *